United States Patent [19]

Tade, III et al.

[11] Patent Number: 4,744,392
[45] Date of Patent: May 17, 1988

[54] NOZZLE DAM SEGMENT BOLT AND KEEPER

[75] Inventors: Lee A. Tade, III, Hixson, Tenn.; Eric M. Weisel, Windsor Locks, Conn.; Richard L. Church, Port St. Lucie, Fla.

[73] Assignee: Combustion Engineering, Inc., Windsor, Conn.

[21] Appl. No.: 19,725

[22] Filed: Feb. 27, 1987

[51] Int. Cl.[4] .............................................. F16L 55/10
[52] U.S. Cl. ....................................... 138/89; 292/59; 292/61; 376/203; 376/277; 376/463
[58] Field of Search ...................... 138/89, 93; 165/71; 220/315, 323; 292/59, 61; 376/203, 204, 277, 463

[56] References Cited

U.S. PATENT DOCUMENTS

| | | | |
|---|---|---|---|
| 2,843,154 | 7/1958 | Hosking | 220/239 |
| 3,101,641 | 8/1963 | Walker et al. | 411/999 |
| 3,834,422 | 9/1974 | Larson | 138/93 |
| 4,482,076 | 11/1984 | Wentzell | 220/232 |
| 4,483,457 | 11/1984 | Schukei et al. | 138/93 |
| 4,518,015 | 5/1985 | Fischer | 138/93 |

Primary Examiner—Deborah L. Kyle
Assistant Examiner—Richard Wendtland
Attorney, Agent, or Firm—John H. Mulholland

[57] ABSTRACT

A bolt and keeper secure nuclear steam generation isolation dam segments in assembled relation. The bolt is rotated into locked position with its handle in a slot as a transverse projection on the bolt end is moved along a ramp into a securing notch against the bias of a compressible rubber spring.

8 Claims, 4 Drawing Sheets

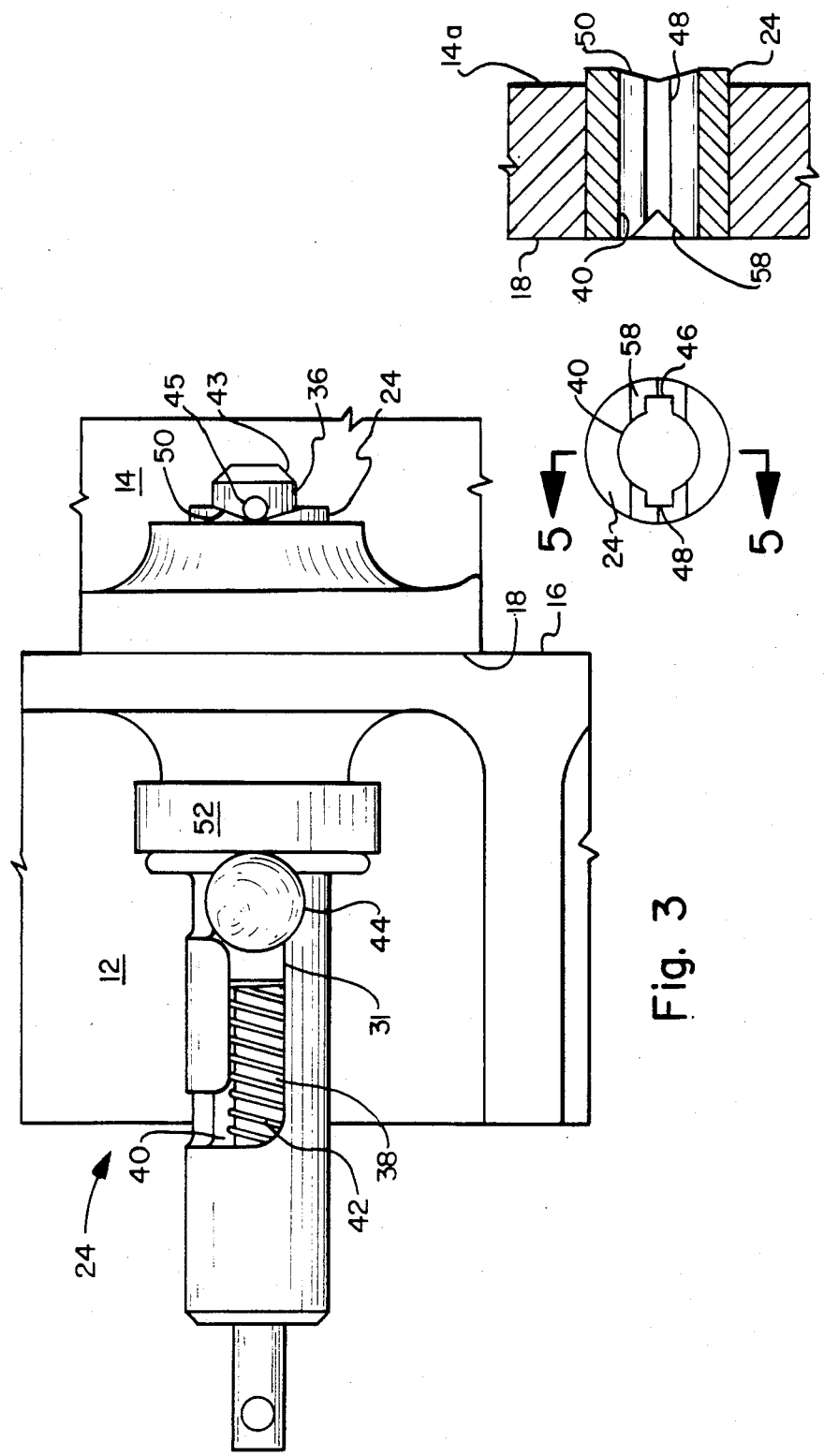

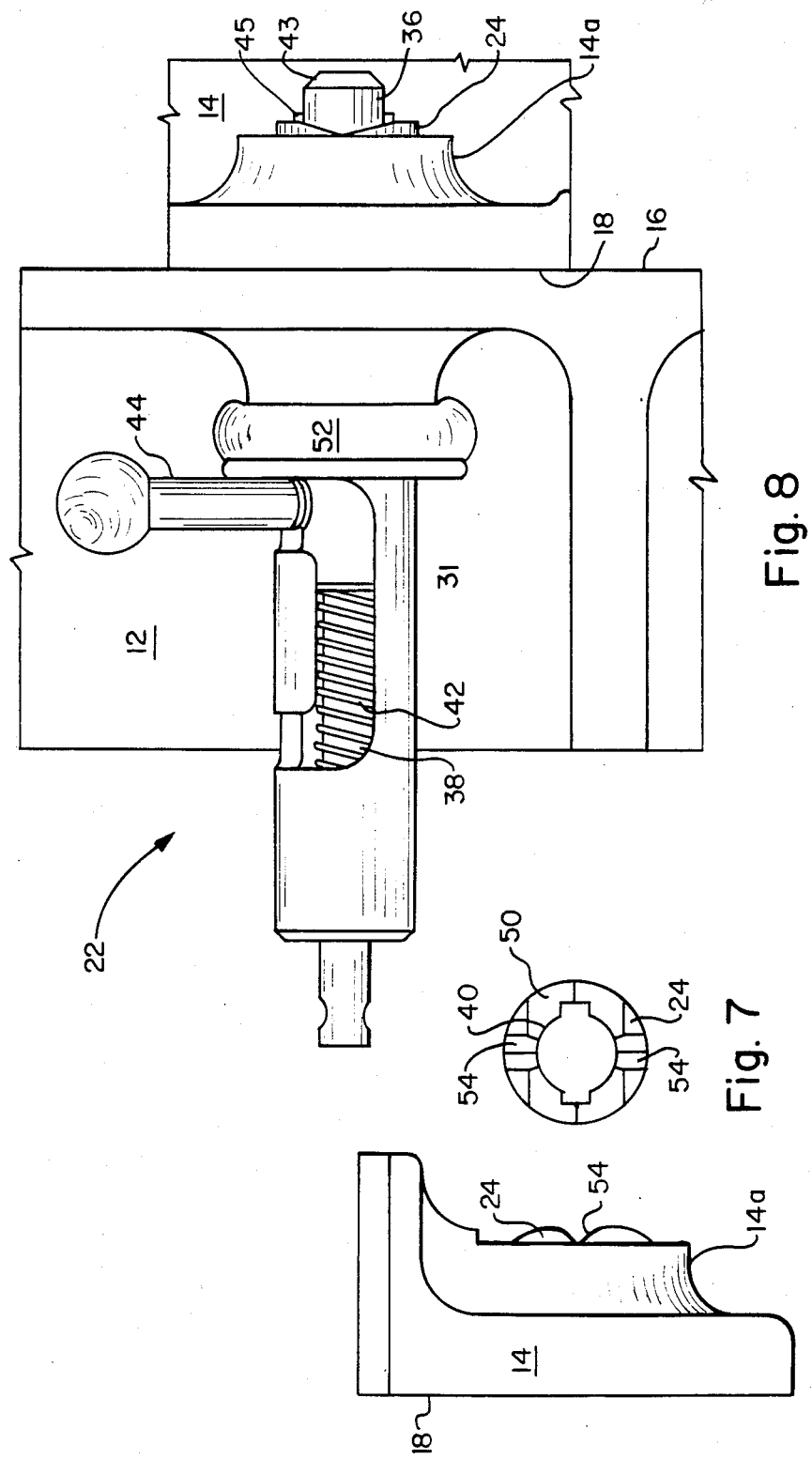

NOZZLE DAM SEGMENT BOLT AND KEEPER

FIELD OF THE INVENTION

The present invention relates to an improvement in nozzle dams for steam generators of the type in association with a conventional nuclear power generating system. Nozzle dams are used to provide a temporary liquid tight seal in a nozzle of a steam generator to isolate the generator from the nuclear reactor with which it is associated.

BACKGROUND OF THE INVENTION

To employ a plug to affect blockage of a normally open flow passage for repair purposes has been known in the prior art in connection with many types of fluid flow systems. Examples of expansible plugs or dams of the prior art may be found in U.S. Pat. Nos. 2,843,154; 3,834,422; and, 4,518,015. From these concepts, which are generally applicable to flow passageways, nozzle plugs for steam generators of conventional nuclear power generating systems have developed. An example of such a nozzle plug for effecting a temporary blockage of a passage into or out of a nuclear power system steam generator will be found in U.S. Pat. No. 4,482,076 to Timothy H. Wentzell, assigned to Combustion Engineering, Inc., the assignee of the instant invention.

Periodically, there arises a need to conduct maintenance on, and to effect minor repairs of, the internal components of the steam generator. To accomplish such tasks, it is necessary for one or more persons to physically enter the steam generator. Ingress and egress to and from the steam generator by such persons is accomplished through suitable means such as, for example, an access port or manway. While such persons are working in the steam generator, it is desirable that a blockage of the inlet and outlet nozzle of the steam generator be effected to ensure that there will be no fluid flow through the steam generator which might physically imperil the people working therein.

One such design of a nozzle plug for a nuclear steam generator is disclosed in the U.S. Pat. No. 4,482,076 mentioned above. In that design, a plurality of plate sections or segments are assembled within the steam generator to form the plug or nozzle dam. U.S. Pat. No. 4,483,457 to Schukei and Tade discloses a variation from the Wentzell patent in that it provides for the segments of the nozzle dam to be hinged together.

Both of these patents teach dams which rely upon locking pins or bolts of the type disclosed in U.S. Pat. No. 3,101,641 which enter inserts or keepers in holes in the side wall of the nozzle to hold the dams in place. The pins are tethered on lanyards and loosely attached to the dam segments until the dam is placed in its approximate final position in the nozzle. They are then manually inserted through holes in bosses on the dam structure and into the inserts. U.S. Pat. No. 4,482,076 teaches utilizing these lanyard tethered pins or bolts to hold nozzle dam segments together. U.S. patent application Ser. No. 863,755, filed May 16, 1986 and assigned to the same assignee as the instant application, shows a different lock means for insertion through the connecting holes in the segments. Both prior types are overdesigned material wise, making them cumbersome to use and adding extra weight to the dam. The nozzle dam locking pin assembly of U.S. patent application Ser. No. 863,755 has been utilized as one element of the novel bolt assembly and keeper member combination to overcome this problem.

The process of finally assembling the dam segments and aligning the dam boss holes, insert holes and tethered pins, usually is difficult and requires two men. Invariably the lanyards tangle, slowing the operation. Two independent nozzle dams are usually used in each steam generator. Accordingly, a lighter, camlock or bolt assembly and keeper member which are permanently attached to the nozzle dam and permit faster assembly of the dam segments is desirable.

SUMMARY OF THE INVENTION

The improved nozzle dam bolt assembly and keeper member of the invention are permanently attached to the nozzle dam segments by a press fit. A close tolerance hole drilled in each boss of the dam segments has either a cylindrical body portion of the bolt assembly or of the keeper member pressed into the hole to form the pressed fit. Thus, the bolt assemblies and keeper assemblies become part of the dam segments with no bothersome lanyards or other temporary attaching structure.

The novel bolt assembly and keeper member combination is designed such that when one segment having a bolt assembly is properly lined up for assembled relationship with an adjacent segment having a keeper member, the bolt on the one segment will pass into the keeper on the other segment to secure the segments together. Nuclear steam generator isolation dams normally are made up of two or three segments and, therefore, there are typically one or two such bolted joints in a dam with each joint typically having three bolt assembly and keeper member combinations.

The bolt assembly includes an elongated bolt body having an outer dam segment engaging surface portion. An axial bore is provided in the bolt body and, typically, will include a first enlarged diameter bore portion at one end of the bore and a second and reduced diameter bore portion at the opposite end of the bore. An elongated bolt pin is slidably mounted in the bore and includes a first enlarged diameter pin portion in slidable engagement with the first enlarged diameter bore portion. A second and reduced diameter portion at the opposite end of the pin is in slidable engagement with the second and reduced diameter bore portion. A spring for biasing the bolt pin toward a position of projection from the end of the bolt body bore portion in the direction of the keeper surrounds the pin within the bolt body. A lever within an axially directed slot is provided to secure the bolt pin in a position of retraction within the bolt bore against the spring urging.

The keeper member of the combination includes an elongated keeper body having a dam segment engaging surface portion and an axial bore for receiving the bolt pin of the adjacent dam segment. The bolt pin is provided with a transverse projection on the end adjacent the keeper member. A slot parallel to the bore is in open communication with it for receiving the transverse projection as the bolt pin is slidably received in the keeper body axial bore. The keeper body and the bolt pin are proportioned to permit the transverse projection to pass to the end of the slot and be rotated into engagement with the end of the keeper body opposite the bolt assembly. A second biasing means in the form of a rubber washer mounted on the exterior of the bolt body acts against the force of the spring to hold the transverse projection against the end of the keeper body opposite the bolt pin assembly.

The end of the keeper body against which the transverse projection rides includes a cam ramp for guiding the rotated bolt pin transverse projection to a position of securement in a recess in the end of the keeper body. In the preferred embodiment the bolt assembly and keeper member have two transverse projections, two slots, two ramps, and two recesses in the end of the keeper body symetrically arranged on opposite sides of the bore. The recess in the end of the keeper body is tapered to provide a guiding notch. The slot is also provided with a tapered entry surface in the form of a V-notch to guide the transverse projection into the slot of the keeper body.

The rubber washer on the exterior of the bolt assembly body is compressed by means of a lever secured to the bolt pin and extended outwardly through the transverse slot in the bolt assembly body communicating the bolt pin bore with the outside of the body. The transverse slot has an axial portion sufficient in length to permit axial travel of the lever as the bolt pin moves axially to project or to retract and the slot further includes two spaced circumferential poritions sufficient in length to permit rotational travel of the lever and bolt pin to positions which prevent axial travel of the lever and bolt pin for securing the bolt pin in either retracted position or in locked position for securing the segments together.

Accordingly, it is an object of the present invention to provide an improved nozzle dam segment assembly having the segments locked together in proper relationship by means of a bolt assembly and a keeper member combination which provides faster assembly and securing of the nozzle dam segments, is of lighter weight, and, therefore, reduces the overall weight of the nozzle dam, and which is permanently attached to the nozzle dam without the need of lanyards or other loose members.

BRIEF DESCRIPTION OF THE DRAWINGS

FIG. 3 is an elevational view of a bolt assembly and keeper member of two adjacent nozzle dam segments with the bolt pin in the keeper before the bolt lever and bolt pin have been rotated to the locked and secured position.

FIG. 4 is an end view of the keeper body adjacent the bolt assembly.

FIG. 5 is a cross-sectional view taken along the line 5—5 of FIG. 4.

FIG. 6 is a view taken at right angles to the view in FIG. 4 from below the end of the keeper member body.

FIG. 7 is an end view of the keeper member body and remote from the bolt assembly.

FIG. 8 is a view similar to FIG. 3 but showing the bolt assembly and keeper member combination of FIG. 3 with the bolt lever and bolt pin rotated 90° to the fully locked position with the transverse pins in the keeper V-shaped securing recess in the end of the keeper body remote from the bolt assembly.

DETAILED DESCRIPTION OF THE PREFERRED EMBODIMENT

Figure 1:
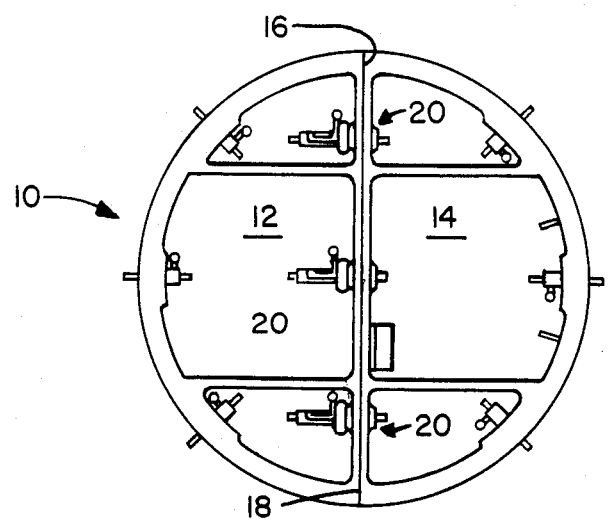
FIG. 1 is a front elevational view of a nozzle dam which includes the improved nozzle dam bolt assembly and keeper member combination of the invention.
Figure 2:
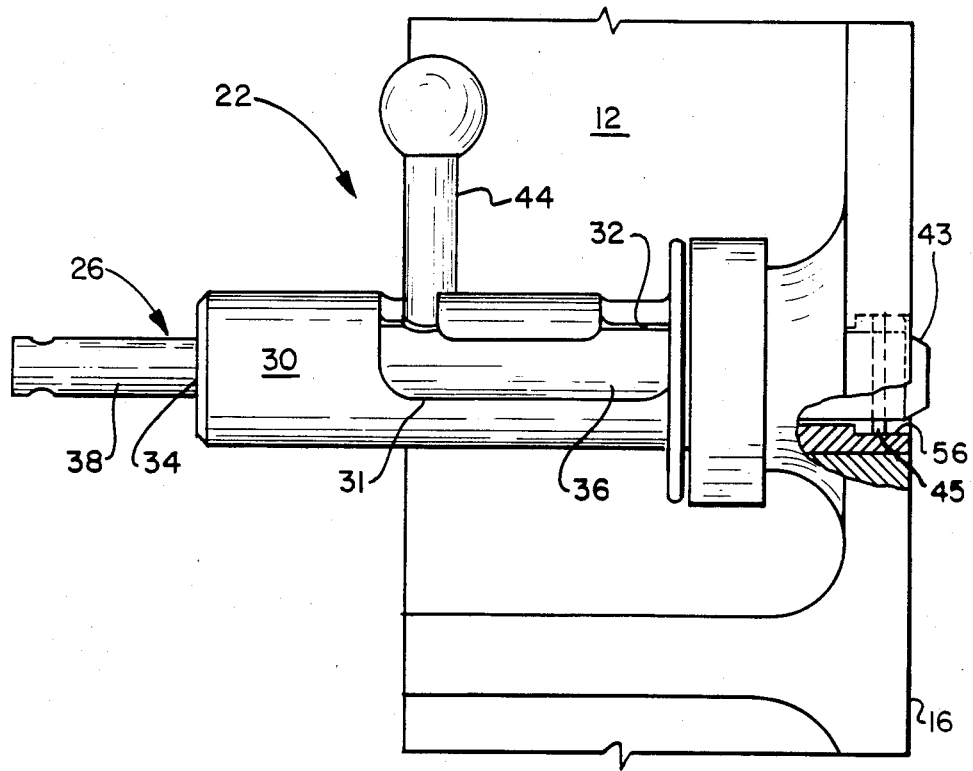
FIG. 2 is an elevational view of the bolt assembly of the invention mounted in a portion of a dam segment with the bolt pin in secured and retracted position.

The numeral 10 generally designates a nuclear steam generator isolation dam made up of assembled segments 12 and 14. The dam 10 is shown as being made up of these two segments for illustration purposes, but it shoud be realized that nozzle dams of larger size are often made to include more than two segments.

The segments 12 and 14 meet in a common face-to-face relationship with a surface 16 of the segment 12 in aligned relationship with the surface 18 of the segment 14. A plurality of the novel bolt assembly and keeper member combinations, generally designated by the numeral 20, secure the assembled dam segments 12 and 14 in properly assembled relationship. Each combination 20 includes a bolt assembly generally designated 22 and a keeper member generally designated 24.

The bolt assembly 22 includes a pin 26 slidably mounted in an elongated body 30. The elongated body 30 has an outer cylindrical dam engaging surface portion and a central axial bore made up of a first enlarged diameter portion 32 at one of the end bore and a second and reduced diameter bore portion 34 at the opposite end of the bore. The elongated pin 26 slidably mounted in the bore includes a first enlarged diameter pin portion 36 and a second and reduced diameter pin portion 38. A shoulder (not seen) lies between pin portions 36 and 38. The enlarged diameter pin portion 36 rides in the first enlarged diameter bore portion 32 and the second and reduced diameter pin portion 38, at the opposite end of the pin 26 is slidably mounted within the reduced diameter bore portion 34.

Adjacent the reduced diameter bore portion 34, in bore portion 32, is a bore chamber 40. A compression spring means 42 within chamber 40 surrounds the reduced diameter pin portion 38 and biases the pin 26 toward a position of projection from the end of body 30 adjacent its large diameter bore portion 32. The projecting pin portion 26 has a tapered surface 43 on its end. Adjacent the tapered surface 43 is a transverse pin 45 which projects from opposite points on the surface of pin portion 36.

With the biasing spring 42 urging the pin 26 outwardly, as soon as the bolt pin 26 comes into alignment with a bore 40 in the keeper member 24, the tapered surface 43 guides the pin 26 into the bore 40.

The body 30 of the bolt pin assembly 22 includes a transverse slot 31 which communicates the bore portion 32 with the outside of the body. A lever or handle 44, which for ease of assembly and manufacture may be threadedly secured to the pin 26, extends outwardly through the slot 31.

The keeper member 24 is a stainless steel hollow body press fit into the dam segment 14 with its axial bore 40 normal to the surface 18 of the dam segment. The keeper member 24 has one end flush with the surface 18 of the segment 14 and an opposite end which extends beyond the boss 14A of dam segment 14 into which it is press fit. The bore 40 of the keeper member 24 is in open communication with slots 46 and 48 parallel to the bore 40 for receiving the projecting ends 45 of the transverse pin as the bolt pin 26 is received in the keeper body 24 axial bore 40. The keeper body 24 and the bolt pin 26 are proportioned to permit the transverse projections 45 to pass the end of the slots 46 and 48 and be rotated into engagement with the end of the keeper body 24. The end surface of the keeper body 24 which is engaged by the projecting ends 45 of the transverse pin define a cam ramp 50. Upon rotation of the bolt pin by means of lever 44, cam ramp 50 guides the rotated bolt pin against the urging of a rubber washer 52, outwardly, until it reaches the recess 54 which is a V-notch in which the transverse pin 45 will seat in a position of securement, where it is held by the urging of the rubber washer 52 as seen in FIG. 8.

The ends of the transverse pin 45 are accommodated as the bolt pin 26 is moved to its fully retracted position by short slots 56 which are parallel to and in open communication with the enlarged bore portion 32 of the bolt body 30. As the bolt pin 26 advances out of the retracted position and into the bore 40, a V-notch 58 guides the ends 45 of the transverse pin into the slots 46 and 48, thus defining a tapered entry surface in the keeper body end adjacent to the bolt assembly 22.

Figure 9:
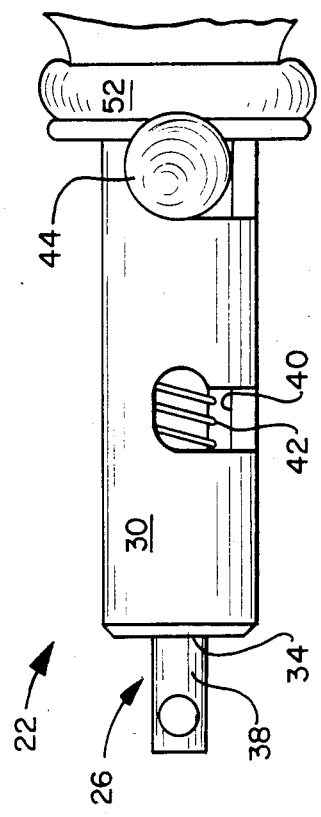
FIG. 9 is a fragmentary plan view of the bolt assembly as shown in FIG. 8.

The rubber washer 52 on the exterior of bolt assembly body 30 is compressed by means of the bolt pin lever 44 as it is rotated to move the transverse pin 45 along the ramp 50 to the recess 54, as seen in FIGS. 8 and 9. When secured in this position, with the pin in the recess or notch 54, the dam segments 12 and 14 are securely locked together in properly aligned position in the manner shown in FIG. 1.

Thus, it will be seen that the new and improved bolt assembly and keeper member combination is provided which accomplishes the objective of providing a faster assembly of the nozzle dam segments while reducing the overall weight of the nozzle dam. This is accomplished by means which are attached permanently to the nozzle dam.

What is claimed is:

1. In a nuclear steam generator isolation dam segment assembly, a bolt assembly and a keeper member combination for securing a plurality of assembled dam segments, said bolt assembly including an elongated bolt body having an outer dam segment engaging surface portion, an axial bore in said bolt body, a first and large diameter bore portion at one end of said bore, a second and reduced diameter bore portion at the opposite end of said bolt body bore, an elongated bolt pin slidably mounted in said bore and including a first and large diameter pin portion in slidable engagement with said first and large diameter bore portion and a second and reduced diameter portion at the opposite end of said pin in slidable engagement with said second and reduced diameter bore portion first means for biasing said bolt pin and said first and large diameter pin portion axially toward a position of projection from the end of said first bolt body bore portion, and, means for rotating and securing said bolt pin and said first and large diameter pin portion in both a position of retraction within said first and large diameter bolt bore portion against said means biasing said pin and in a position of protection from said first bolt body bore portion;

said keeper member including an elongated keeper body having a dam segment engaging surface portion, an axial bore in said keeper body for receiving said bolt pin when said keeper member is mounted on one dam segment opposite said bolt assembly on an adjacent dam segment assembled thereto, said bolt pin having a transverse projection adjacent the end of the large diameter pin portion remote from said small diameter pin portion, said keeper body axial bore being in open communication with a slot parallel to said bore for receiving said transverse projection as said bolt pin is projected and received in said keeper body axial bore, said keeper body and said bolt pin being proportioned to permit said transverse projection to pass to the end of said slot and be rotated into engagement with the end of said keeper body opposite said bolt pin assembly, and, second means for biasing acting to urge said rotated bolt pin transverse projection toward said end of said keeper body against the force of the means biasing the large diameter pin portion axially toward a position of projection from the end of said bolt body.

2. The bolt assembly and keeper member combination of claim 1 in which said end of said keeper body includes a cam ramp for guiding said rotated bolt pin transverse projection against urging of the second means for biasing to a position of securement in a recess in the end of said keeper body.

3. The bolt assembly and keeper member combination of claim 2 in which two transverse projections, two slots, two ramps and two recesses in the end of the keeper body are symetrically provided.

4. The bolt assembly and keeper member combination of claim 2 in which the recess is a guiding tapered notch.

5. The bolt assembly and keeper member combination of claim 2 in which said slot has a tapered entry surface defining a notch in the keeper body end opposite the ramp to guide the transverse projection into the slot.

6. The bolt assembly and keeper member combination of claim 1 in which the second means for biasing is a rubber washer.

7. The bolt assembly and keeper member combination of claim 6 in which the rubber washer is on the exterior of the bolt assembly body and is compressed by the means for securing said bolt pin and the dam segment on which the bolt pin assembly is mounted.

8. The bolt assembly and keeper member combination of claim 7 in which the means for securing said bolt pin includes a lever secured to said bolt pin and extending outwardly through a transverse slot in said bolt assembly body communicating said bolt pin bore with the outside of said body, said transverse slot having an axial portion sufficient in length to permit axial travel of said lever as said bolt pin moves axially to project or to retract and said slot further includes at least one circumferential portion sufficient in length to permit rotational travel of said lever and bolt pin to a position which prevents axial travel of the lever and the bolt pin.

* * * * *